US011233278B2

(12) United States Patent
Podolefsky

(10) Patent No.: US 11,233,278 B2
(45) Date of Patent: *Jan. 25, 2022

(54) RECHARGEABLE BATTERY POWER SYSTEM HAVING A BATTERY WITH MULTIPLE USES

(71) Applicant: Green Machine Equipment, Inc., Buffalo, NY (US)

(72) Inventor: Noah Podolefsky, Boulder, CO (US)

(73) Assignee: GREEN MACHINE EQUIPMENT, INC., Buffalo, NY (US)

( * ) Notice: Subject to any disclaimer, the term of this patent is extended or adjusted under 35 U.S.C. 154(b) by 377 days.

This patent is subject to a terminal disclaimer.

(21) Appl. No.: 16/276,915

(22) Filed: Feb. 15, 2019

(65) Prior Publication Data
US 2020/0266496 A1    Aug. 20, 2020

(51) Int. Cl.
| | |
|---|---|
| *H01M 10/42* | (2006.01) |
| *B60L 50/51* | (2019.01) |
| *H01M 50/10* | (2021.01) |
| *H02J 7/00* | (2006.01) |

(52) U.S. Cl.
CPC .......... *H01M 10/425* (2013.01); *B60L 50/51* (2019.02); *H01M 50/10* (2021.01); *H01M 2010/4271* (2013.01); *H02J 7/00* (2013.01); *H02J 7/0013* (2013.01); *H02J 7/0042* (2013.01); *H02J 7/00302* (2020.01)

(58) Field of Classification Search
CPC .......... H01M 10/425; H01M 10/4257; H01M 2010/427; H01M 50/10; B60L 50/51
See application file for complete search history.

(56) References Cited

U.S. PATENT DOCUMENTS

| | | | | |
|---|---|---|---|---|
| 9,954,259 | B1 * | 4/2018 | Grace | B60L 58/27 |
| 2005/0078468 | A1 * | 4/2005 | DiPoala | H05K 9/0056 |
| | | | | 361/818 |
| 2005/0158609 | A1 * | 7/2005 | Finkelshtain | H01M 8/0271 |
| | | | | 429/421 |
| 2006/0117192 | A1 * | 6/2006 | Nokkonen | G06F 1/3203 |
| | | | | 713/300 |

(Continued)

*Primary Examiner* — Drew A Dunn
*Assistant Examiner* — Tarikh Kanem Rankine
(74) *Attorney, Agent, or Firm* — Emerson, Thomson & Bennett, LLC; Roger D. Emerson

(57) ABSTRACT

Conventional internal combustion engine technology has been around for decades and historically has been the primary power source for virtually all industrial equipment. It relies on carbon-based fuels, is loud, polluting, and the machines it powers are expensive to operate and maintain. A self-contained, rechargeable battery system is provided that possesses improved power than comparable diesel and gas engines and it generates zero emissions, is virtually maintenance free, is quiet, and recharges overnight via a standard electrical outlet. The rechargeable battery power system can be installed in new and used construction equipment and may be used wherever a source of power is required including smart grid application. It can be safely used indoors, in neighborhoods and other locations sensitive to the side effects of internal combustion engines. There is a battery management system that controls sequential shutdown system and a power reserve system to control operation of the battery.

17 Claims, 12 Drawing Sheets

(56) References Cited

U.S. PATENT DOCUMENTS

| | | | | |
|---|---|---|---|---|
| 2007/0002518 A1* | 1/2007 | Wilk | ............... | H01G 9/12 |
| | | | | 361/272 |
| 2008/0042622 A1* | 2/2008 | Wong | ............... | H02J 7/0069 |
| | | | | 320/162 |
| 2009/0258282 A1* | 10/2009 | Harada | ............... | H01M 10/613 |
| | | | | 429/61 |
| 2009/0293035 A1* | 11/2009 | Galbi | ............... | G06F 30/394 |
| | | | | 716/128 |
| 2012/0126820 A1* | 5/2012 | Tan | ............... | G01R 31/386 |
| | | | | 324/434 |
| 2012/0186888 A1* | 7/2012 | Ross | ............... | H02P 6/04 |
| | | | | 180/65.31 |
| 2012/0207620 A1* | 8/2012 | Dalum | ............... | B60L 55/00 |
| | | | | 417/44.1 |
| 2012/0293128 A1* | 11/2012 | Kim | ............... | H02J 7/0016 |
| | | | | 320/117 |
| 2013/0119769 A1* | 5/2013 | Johnson | ............... | B60L 55/00 |
| | | | | 307/68 |
| 2013/0164567 A1* | 6/2013 | Olsson | ............... | H01M 10/425 |
| | | | | 429/7 |
| 2013/0181526 A1* | 7/2013 | Iwasaki | ............... | H02J 3/386 |
| | | | | 307/43 |
| 2014/0002003 A1* | 1/2014 | Kim | ............... | H02J 3/32 |
| | | | | 320/103 |
| 2014/0072855 A1* | 3/2014 | Schaefer | ............... | H01G 2/08 |
| | | | | 429/120 |
| 2014/0244051 A1* | 8/2014 | Rollins | ............... | F04D 27/004 |
| | | | | 700/282 |
| 2014/0315048 A1* | 10/2014 | Yang | ............... | B60L 58/21 |
| | | | | 429/50 |
| 2015/0084411 A1* | 3/2015 | Cho | ............... | B60L 58/15 |
| | | | | 307/10.1 |
| 2015/0214585 A1* | 7/2015 | Sun | ............... | H01M 50/502 |
| | | | | 429/120 |
| 2016/0218401 A1* | 7/2016 | Hermann | ............... | H01M 10/486 |
| 2016/0233474 A1* | 8/2016 | Kagami | ............... | B60L 58/21 |
| 2017/0214253 A1* | 7/2017 | Kim | ............... | H02J 7/0013 |
| 2018/0097376 A1* | 4/2018 | Renaud-Byrne | ............... | H02J 7/0024 |
| 2018/0108891 A1* | 4/2018 | Fees | ............... | B60K 1/04 |
| 2018/0212288 A1* | 7/2018 | Grace | ............... | H01M 10/633 |

* cited by examiner

RECHARGEABLE BATTERY POWER SYSTEM HAVING A BATTERY WITH MULTIPLE USES

BACKGROUND

Energy is in constant need for powering equipment of all types and kinds. Recently, there has been a trend to power a plurality of different machines, for example automobiles, motorcycles, and construction equipment with electric. Typically these electrically powered devices will carry a power source in the form of a battery to power them.

However, there are needs for improved battery designs that have a more universal applicability so that the battery is capable of powering devices from light towers to bulldozers.

SUMMARY

There is provided a rechargeable battery power system having a battery with multiple uses. The rechargeable battery power system provides for a clean and quiet power source that includes a self-contained battery that does not require active cooling and that can be used in a plurality of different applications that require electric power.

The rechargeable battery power system includes a battery assembly that has a battery housing and a battery, and the battery is disposed in the battery housing. The battery is a multiple use battery because it may be used in a plurality of different applications ranging from a stand-alone power source to a power source for powering equipment, lights and virtually any other machine that has a need for electrical power, for example machines traditionally powered by fossil fuels, such as diesel.

The battery housing has a base wall joined to first and second side walls and the base wall joined to opposed first and second end walls. There is a housing cover that is releasably joined to the first and second opposed side walls and the opposed first and second end walls such that the cover is disposed opposite the base wall.

The first sidewall includes a metal layer and first and second foam layers and a plastic sheet such that the first foam layer abuts against and is joined with the metal layer, and the first foam layer abuts against and is joined with the second foam layer. The second foam layer abuts against and is joined with the plastic sheet.

The second side wall is structurally the same as the first side wall.

The top wall has opposed exterior and interior sides. Joined to the interior side of the top wall is a foam sheet that abuts against and is joined with the metal layer. The top wall has an electronics enclosure that may be made of metal that abuts against and is joined to the exterior of the top wall.

The first end wall and second end wall have opposed exterior and interior sides. Joined to the interior sides of the first end wall and second end wall are plastic sheets, and foam sheets are joined to the plastic sheets such that the plastic sheets are disposed between the interior sides of the end walls and the foam sheets. The second end wall has an exterior end wall surface and a service disconnect extends from the exterior side.

The base wall of the battery housing has a metal base wall sheet having opposed interior and exterior metal base wall surfaces, and joined to the interior metal base wall surface is a base wall rubber sheet.

As previously mentioned, disposed internal to the battery housing is the battery. The battery has first and second module banks. Each of the first and second module banks is made of from groups of modules, and each module is made of individual cells. In one preferred embodiment each module has eight individual (8) cells that are electrically connected to one another, and the modules are electrically connected to one another to form the groups of modules. The first and second module banks may be electrically connected to one another such that together they can output power. In other embodiments there may be just one just the first module bank and in other embodiments there may be more than tow module banks.

In one of the embodiments, the battery assembly is installed in an excavator or other piece of equipment, for example heavy construction equipment, during the manufacturing process of the excavator or other piece of equipment, in other words at the point of manufacture.

In another embodiment there is provided a method for taking a used piece of equipment, for example an excavator, and removing its engine. Then, the engine compartment is re-configured to house the battery assembly. There is provided a battery management system, a variable frequency driver and a variable frequency brushless electric motor, or other suitable motor, the shaft of which is connected to a hydraulic pump in order to complete the conversion from gas/diesel power to electric power.

The rechargeable battery power system also includes a battery sequential shutdown system that allows the battery, for example when installed in a piece of equipment, to be shut down in a in a series of steps. This sequential shutdown prevents damage to the components of the rechargeable battery and drive motor systems.

In addition, the rechargeable battery power system also includes a reserve power reserve system under the control of the battery management system that provides for a reserve of battery power. The battery reserve system will provide power to the piece of equipment, for example an excavator such that it can be driven to a location where the battery can be recharged. This prevents equipment from becoming inoperable and stranded while in the field. In one of the embodiments a person having authority, for example a foreman, is the only one that can access the power reserve system so that a worker cannot drain the battery to zero at an undesirable location.

BRIEF DESCRIPTION OF THE DRAWING FIGURES

DETAILED DESCRIPTION

Figure 1:
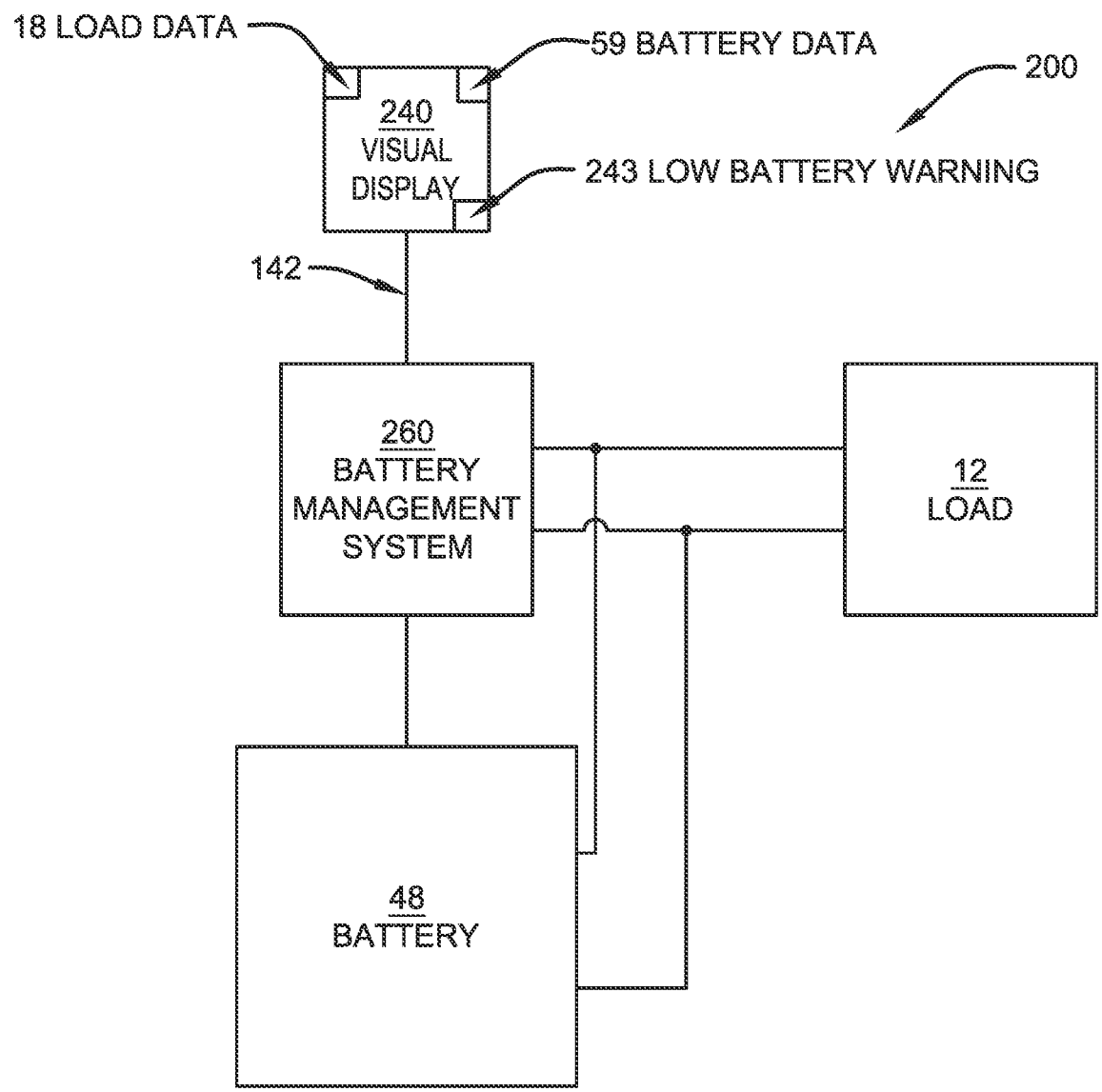
FIG. 1 depicts a general wiring a diagram of a rechargeable battery power system.

At the outset, it is to be understood that like reference numerals are intended to identify the same structural elements, portions or surfaces consistently throughout the several drawing figures, such at elements, portions or surfaces that may be further described or explained by the entire written specification, of which this detailed description is a part. Unless otherwise indicated, the drawings are intended to read (that is, cross-hatching, arrangement of parts, proportion, degree, et cetera) together with the specification, and are considered to be a portion of the entire written description. As used in the description, the terms "horizontal," "vertical," "left, right," "top", "botton.", "up," "down," as well as adjectival and adverbial derivatives thereof (for example, "horizontally", "rightwardly", "upwardly," et cetera) refer to the orientation of the illustrated structure as the particular drawing figure faces the reader. Similarly, the terms "inwardly" and "outwardly" generally refer the orientation of a surface relative to its axis of elongation, or axis of protestation, as appropriate.

Figure 2:
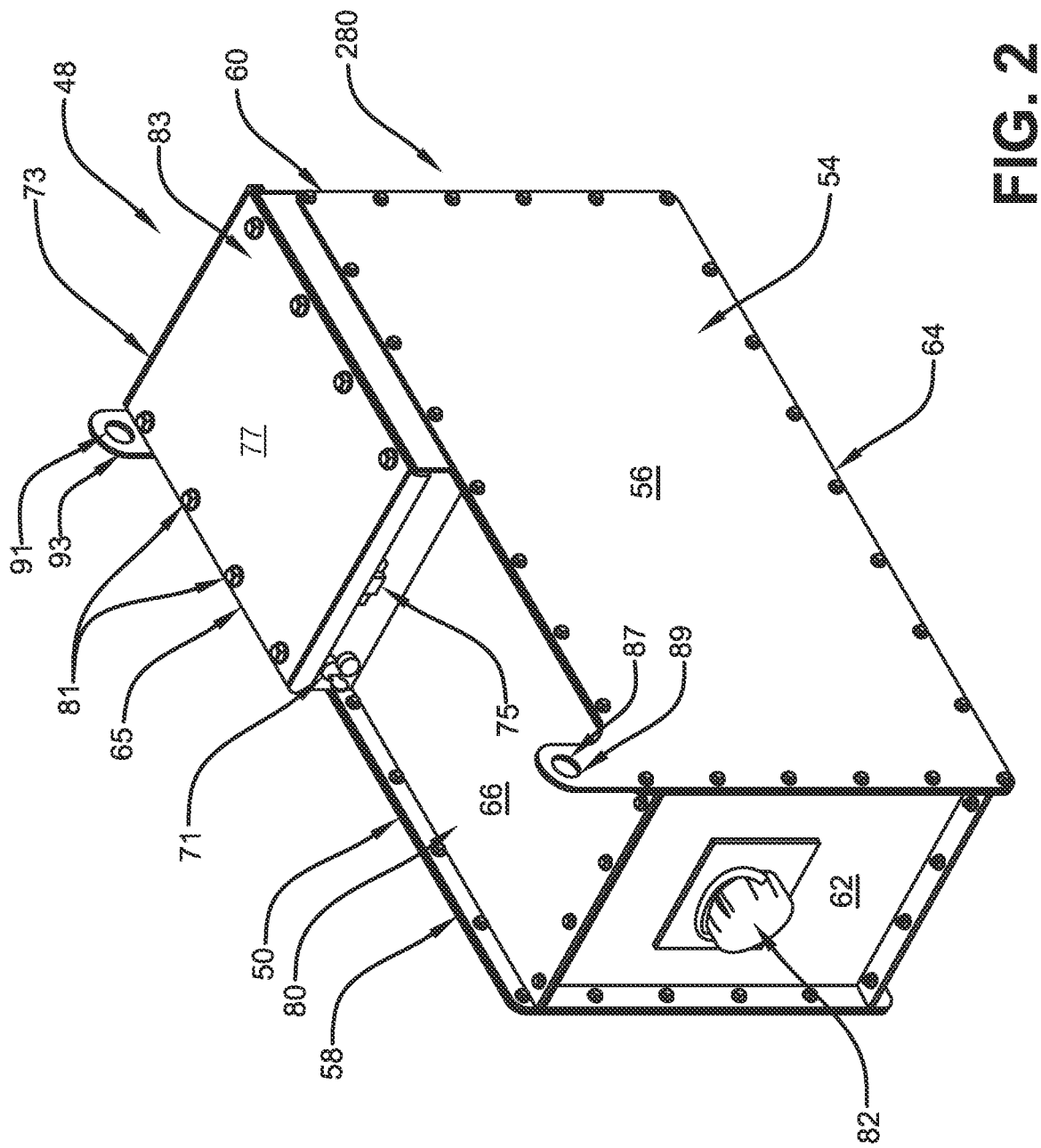
FIG. 2 is a perspective view of an assembled battery for use in the rechargeable battery power system.

Turning now to FIG. 1, shown therein is a general block diagram of a rechargeable battery power system 200 that includes a battery assembly 48 that has multiple uses. As shown, the rechargeable battery power system 200 also includes a battery management system 260 (FIGS. 1 and 5) and a visual display 240. The battery assembly 48 includes a battery 280 (sometimes referred to herein as a battery pack 280) that is rechargeable. As shown in FIG. 2, the battery assembly 48 also includes a battery housing 54 that houses the battery 280 (FIG. 3) therein, and the battery 280 stores electrical energy and is capable of powering a load 12, for example an electric motor. The battery management system 260 (sometimes referred to herein as BMS 260) controls the battery 280.

The battery management system 260 is in communication with the visual display 240 that is capable of displaying battery data 59, and displaying load data 18 that pertains to the operation of the battery 280 as will be described presently.

Figure 3:
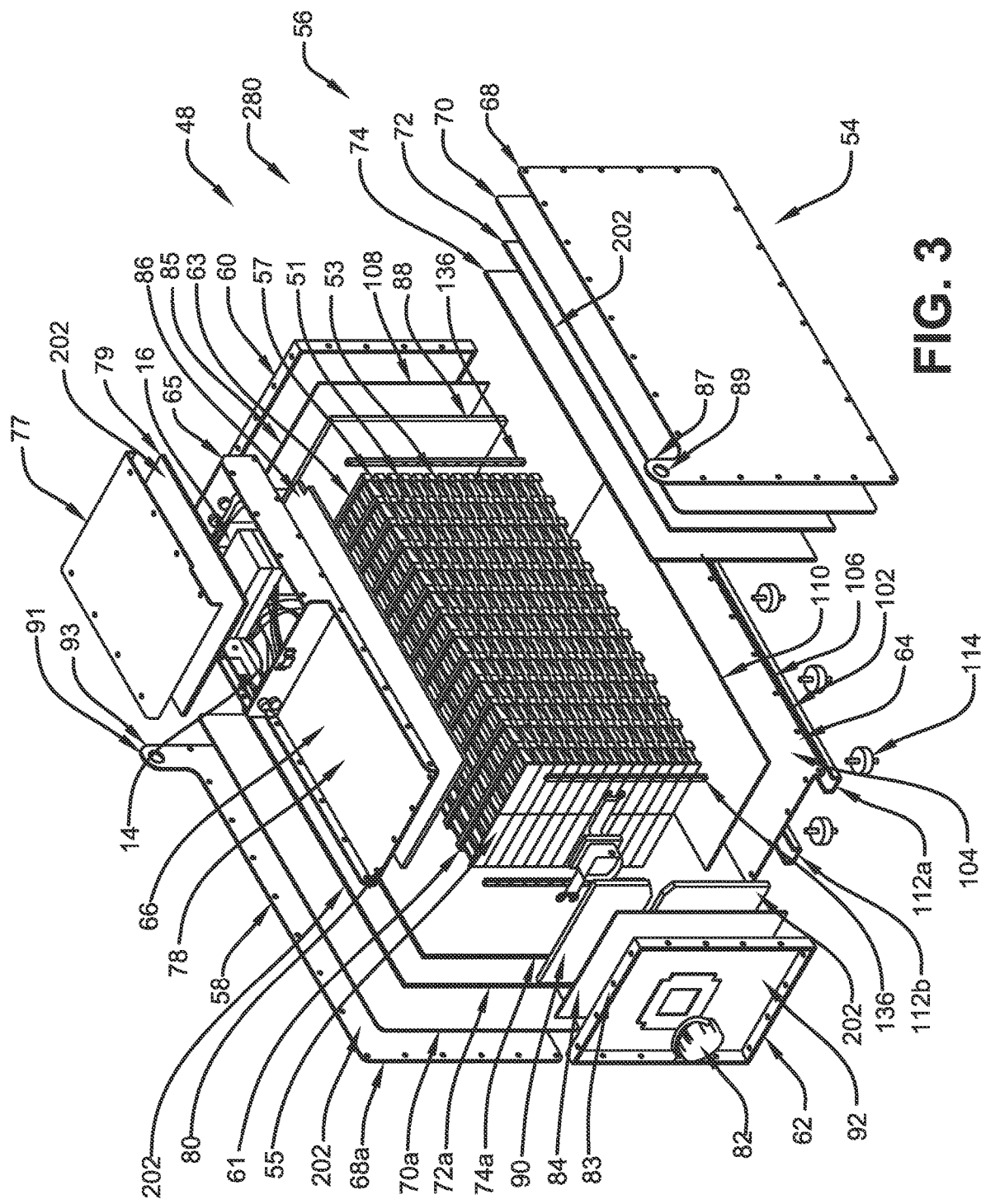
FIG. 3 is an expanded view of the battery assembly shown in FIG. 2.
Figure 5:
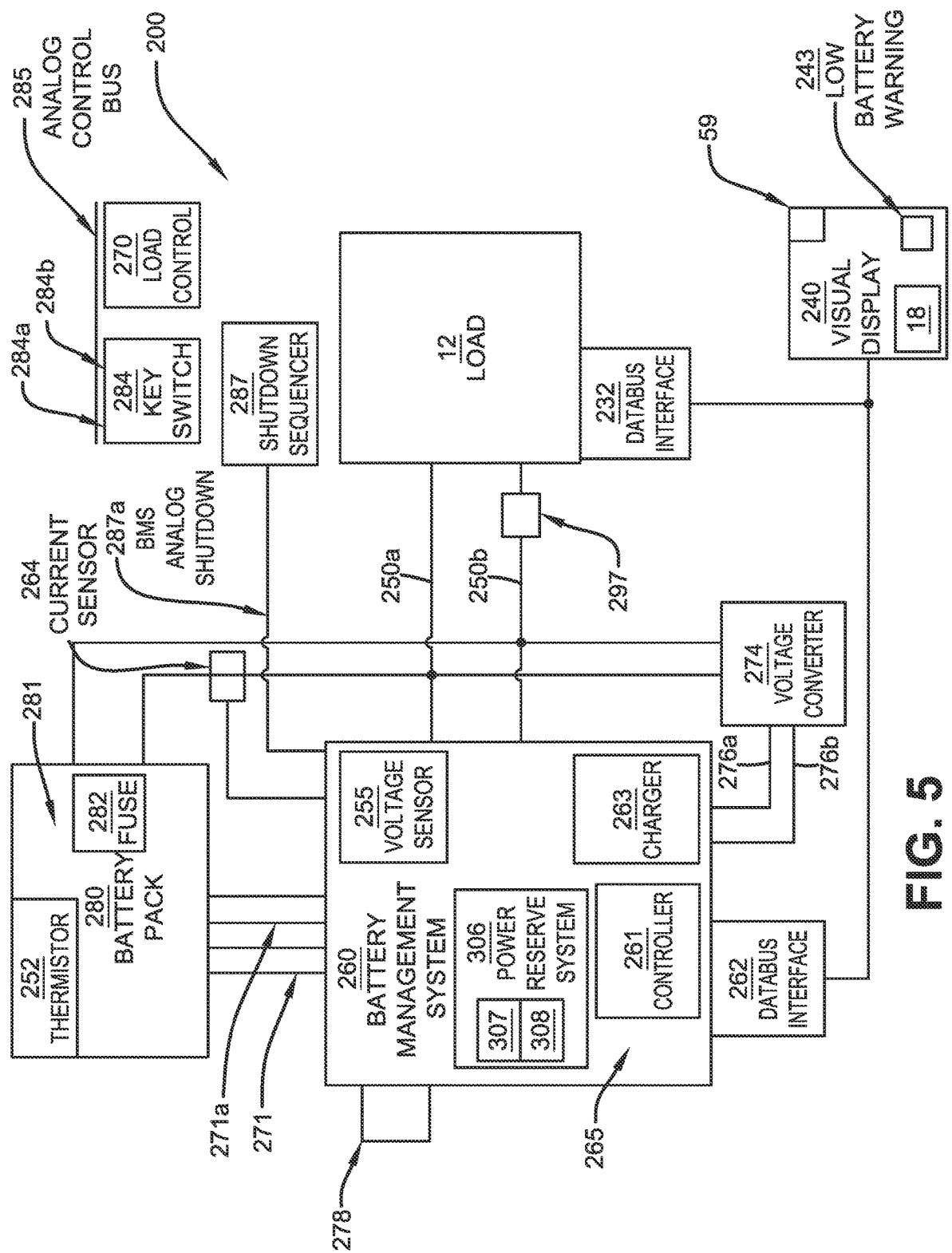
FIG. 5 is a system diagram of the of the battery management system

As shown in FIG. 5, the battery 280 is connected to the battery management system 260 on battery sensor lines 271 and battery communication lines 271a. The battery management system 260 has a battery management interface 278, for example a service disconnect 82, as shown in FIGS. 3 and 5 for connection to an external power source such as the AC outlet 315 shown in FIG. 8. Thus, when the battery management system 260 is connected to the external power source through the service disconnect 82 electricity is delivered to charge the battery 280.

Use of the rechargeable battery power system 200 begins with connecting the external power source to the battery 280 by way of the interface service disconnect 82. The battery management system 260 detects the connection made to the battery 280 and controls the flow of electricity through the battery lines 271 as shown in FIG. 5 to charge the battery 280. Electricity continues to flow from the external electrical power source through battery lines 271 and to the battery 280 until the battery 280 is fully charged. It is pointed out that the service disconnect 82 may be disconnected from the external electrical power source prior to completely charging the battery 280. The external electrical power is most commonly obtained from the power grid, but may be a generator, for example a portable diesel-powered generator may be used to provide electricity.

The battery 280 is rechargeable and can be embodied as a lithium-ion battery that may be of several types, including but not limited to lithium nickel manganese cobalt oxide (NMC), a lithium cobalt (LCO), a lithium iron phosphate (LFP); a lithium manganese oxide (LMO); and, a lithium nickel cobalt aluminum (NCA).

It is pointed out that the battery 280 is adaptable for use in virtually any application requiring electrical power including vehicles, machines, homes, businesses and the like. In other words, the applications wherein the battery 280 of the battery assembly may by employed and used is without limit.

Figure 4:
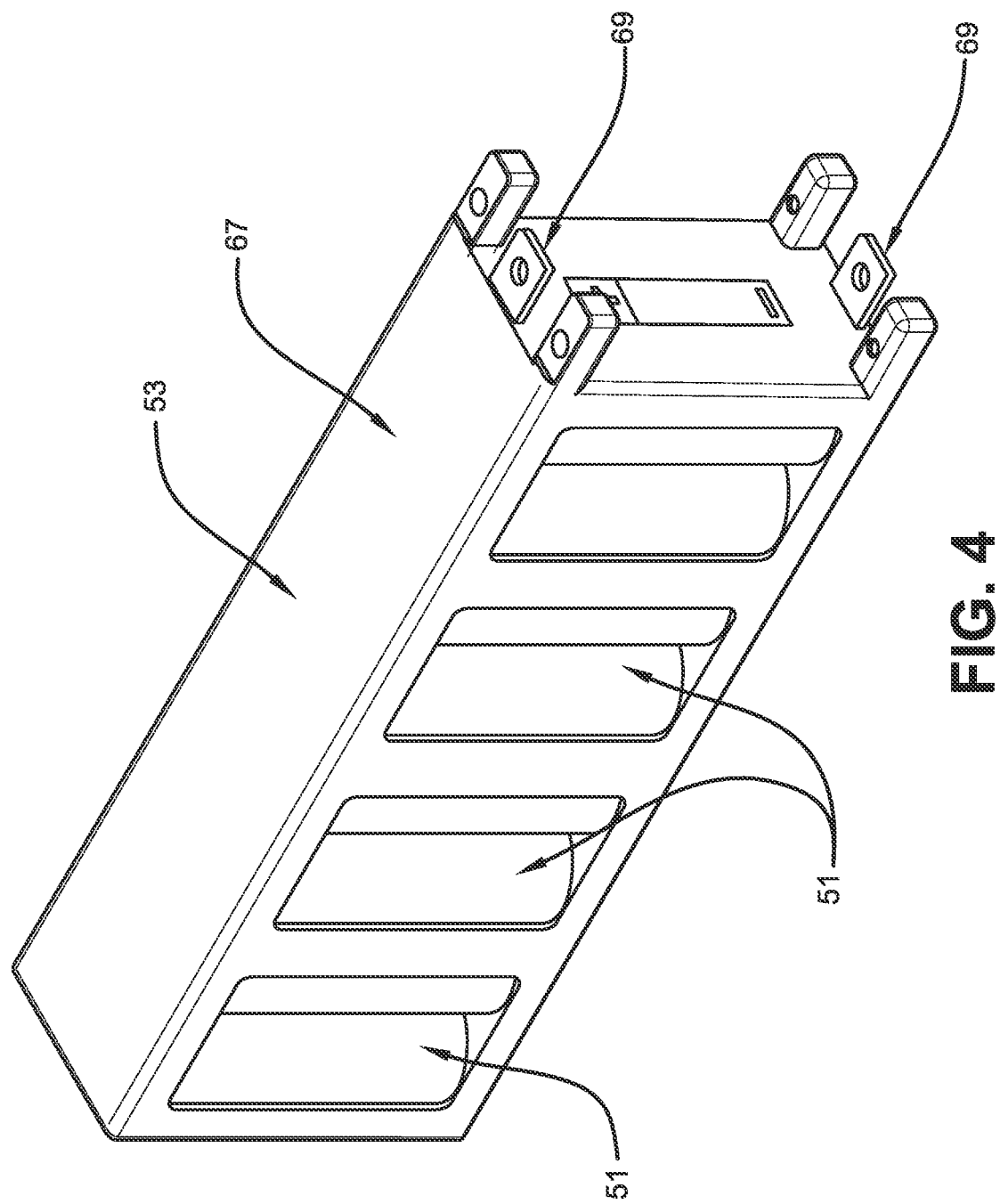
FIG. 4 is a diagrammatic view of a module and cells.

FIG. 2 is a perspective view of the battery assembly 48, and FIG. 3 shows an exploded view of the battery assembly 48. As shown in FIG. 3 the battery 280 has first and second module banks 61, 63 that are in one embodiment substantially the same. The first module bank 61 is made from a first group of modules 55, and the second module bank 63 is made from a second group of modules 57. In turn, the first and second groups of modules 55, 57 are each made from individual modules commonly designated 53, and each individual module 53 has individual cells commonly designated 51. The individual cells 51 are embodied as rechargeable electrochemical cells in one of the embodiments and are for storing electrical energy. In one preferred embodiment and as shown in FIG. 4, each individual module 53 has eight (8) individual cells 51 that are electrically connected to one another, and the individual modules 53 are electrically connected to one another to form the first and second groups of modules 55, 57. In other preferred embodiments each individual module 53 may have more or less than eight individual cells 51. The first module bank 61 is electrically connected to a bus bar 136 for allowing current to flow to the load 12, and the second module bank 63 is electrically connected to connected to another bus bar 136 for allowing current to flow to the load, or in another embodiment the bus bars 136 there is just one bus bar connected to the first and second module banks 61, 63.

As shown in FIG. 4, there is the individual module 53 that has a module case 67 and the individual cells 51 are stacked together and supported in the module case 67. Module terminals 69 extend from the module case 67 and the module terminals 69 can be electrically connected to other individual modules 53.

As shown in FIGS. 2 and 3 and as previously mentioned, the battery housing 54 of the battery assembly 48 includes opposed first and second side walls 56, 58 and opposed first and second end walls 60, 62 and a base wall 64. The first and second opposed side walls 56, 58 and the opposed first and second end walls 60, 62 extend from and are joined or connected to the base wall 64. The battery housing 54 also has a top wall 66 that is joined to the first and second opposed side walls 56, 58 and the opposed first and second end walls 60, 62 such that it is opposite the base wall 64. The top wall 66, the first and second opposed side walls 56, 58, the opposed first and second end walls 60, 62 and base wall 64 may be connected by any suitable fastener 81 or method, for example with nuts and bolts, screws, welds, and combinations thereof. The top wall 66 supports an electronics enclosure 65, and the electronics enclosure supports a metal plate 77, a reserve switch 71, a first communication port 73 and a second communications port 75.

As shown in FIG. 3, the first sidewall 56 is layered and includes a metal layer 68 and first and second foam layers 70, 72, and a plastic sheet 74 that faces the battery 280. The plastic sheet 74 in one preferred embodiment is a polyvinyl chloride sheet (sometimes referred to as PVC). In other preferred embodiments may be a polycarbonate resin sheet, or other thermoplastic sheet. The polycarbonate resin sheet can be a sheet of LEXAN®. LEXAN® is a registered trademark of Sabic Innovative Plastics IP B.V. having a business address of Plasticslaan 1, 4612 PX, Bergen OP Zoom, Netherlands and LEXAN® is commercially available and well known to those having ordinary skill in the art. The first foam layer 70 abuts against and metal layer 68 and an adhesive 202 may used to secure the first foam layer 70 to the metal layer 68. The first foam layer 70 abuts against the second foam layer 72 and they may be are secured or one another, for example with an adhesive 202. The second foam layer 72 abuts against the plastic sheet 74 and may be secured tot the plastic sheet with, for example an adhesive 202. The first foam layer 70 may act or serve as a sealing gasket. A first arm 87 that defines an arm opening 89 extends from the metal layer 69 of the first sidewall 56 and may be used lifting or moving the battery assembly 48 or for any other desired purpose.

The second side wall 58 is structurally similar, and some embodiments the same as, as the first side wall 56 and has a metal layer 68a, first and second foam layers 70a, 72a, and a plastic sheet 74a. The first foam layer 70a abuts against and is joined with the metal layer 68a, and the first foam layer 70a abuts against and is joined with the second foam layer 72a, and the second foam layer 72a abuts against and is joined to the plastic sheet 74a. The metal layer 68a, the first foam layer 68a, the second foam layer 72a and the plastic sheet 74a may be joined with an adhesive 202. The first foam layer 70a of the second side wall 58 that may act as a sealing gasket. A second arm 91 that defines a second arm opening 93 extends from the metal layer 68a of the second side wall 58 and may be used lifting or moving the battery assembly 48.

In another embodiment the first and second arms 87, 91 are not present.

As shown in FIG. 3, the top wall 66 of the battery housing 54 has opposed exterior and interior top wall sides 78, 80, and the electronics enclosure 65 is secured to and extends from the exterior top wall side 78. Joined to the interior top wall side 80 is a module bank cover sheet 86 that may be made of foam and that can be sized such that it can be fitted over the first and second module banks 61, 63. The electronics enclosure 65 that supports the metal plate 77 has an enclosure foam sheet 79 secured to the metal plate 77 with, for example an adhesive 202, and the enclosure foam sheet 79 acts as a sealing gasket and in other embodiments can act as a sealing gasket. The electronics enclosure 65 is attached to the metal plate 77 with fasteners 81 such as bolts or screws and shown in FIG. 2. Fasteners 81 are also used to hold the battery housing 54 together as also shown in FIG. 2.

The second end wall 62 has an exterior end wall surface 92 and the service disconnect 82 is mounted to the second end wall 62 and abuts the exterior end wall surface 92. The service disconnect 82 incapacitates the battery 280, thus preventing the possibility of electric shock to a service technician, or damage to the battery 280 during service or repair. Joined to an interior side 83 of the second end wall 62 is a second end wall plastic sheet 84, and a second end wall foam cover sheet 90 is joined to the second end wall plastic sheet 84, such that the second end wall plastic sheet 84 is positioned between the interior side 83 of the second end wall 62 and the second end wall foam cover sheet 90. In one preferred embodiment the second end wall plastic sheet 84 is made a PVC sheet. In other preferred embodiments the second end wall plastic sheet 84 is embodied as a polycarbonate resin sheet, a thermoplastic sheet, or sheet of LEXAN®. Adhesives 202 may be used to secure the second end wall plastic sheet 84 to the second end wall 62 and to the second end wall foam cover sheet 90.

Joined to an interior side 85 of the first end wall 60 is a first end wall plastic sheet 108, and a first end wall foam sheet 88 is joined to the first end wall plastic sheet 108, such that the first end wall plastic sheet 108 is positioned between the interior side 85 of the first end wall 60 and the first end wall foam sheet 88. The first end wall plastic sheet 108 may be made from the materials describe above in connection with the second end plastic sheet 84, and adhesives 202 may be used to secure the first end wall plastic sheet 108 to the first end wall 60 and to the first end wall foam sheet 88. The first end wall foam sheet 88 is made of the same made of the same materials described above in connection with the second end plastic sheet 84.

The base wall 64 has a metal base wall sheet 102 having opposed interior and exterior metal base wall surfaces 104, 106. Joined or supported on the interior metal base wall surface 104 is a base wall rubber sheet 110.

The battery housing 54 of the battery assembly 48 is mounted on a first and second brace members 112a, 112b that may have channel-shaped cross sections. Isolation mounts commonly designated by reference numeral 250114 are threaded to the base wall 64 and to the first and second brace members 112a, 112b, and the isolation mounts 114 isolate the battery housing 54 from a surface, for example the ground (not shown). In addition, the isolation mounts 114 are adjustable in one embodiment so that the battery housing 54 can be leveled relative to the surface it is supported on.

As previously described, the battery 280 has first and second module banks 61, 63 that are substantially identical in one embodiment and that are disposed internal to the battery housing 54. In other embodiments there may just the first module bank 61 or more than the first and second module banks 61, 63, for example three module banks.

It is pointed out that the battery 280 does not need an active cooling system to be cooled, because the configuration of the battery 280 will not cause it to overheat when used in connection with the applications and embodiments to be described presently. Thus, the battery 280 can be completely sealed from the environment because its construction, and protects against intrusion of water or other contaminants common in harsh environments. In addition, the battery 280 has a high energy density and thus can provide a long run time on a single charge and can be used in construction applications and other application where is a need for electric power.

As shown, in FIG. 5, a current sensor 264 is placed on a first voltage line 250a and the current sensor 264 measures the flow of current in and out of a battery pack 280. A fuse 282 is provided and may be located in the battery housing 54 or within the battery 280 or elsewhere and the fuse 282 is capable of stopping electric current flow in the event the current flow is too high.

The battery pack 280 may also be embodied with just the first module bank 61 or more than the first and second module banks 61, 63. The individual cells 51 are embodied as lithium-ion batteries in one embodiment. In one embodiment the modules 53 may be arranged in a twenty-eight (28)

serial by thirteen (13) parallel array. Other lithium ion type batteries are also suitable for use. The individual cells 51 that make up the in the battery pack 280 are commercially available. Additionally, lithium-ion batteries are well known to those having ordinary skill in the art and therefore are not described in greater detail herein. It is pointed out that the battery pack 280 may have cells from a different battery providers and thus may have a different cell arrangement in order to provide different voltage, capacity, maximum current, or battery housing envelope characteristics. The battery pack 280 is connected to a battery management system 260 via battery sensor lines 271 as shown in FIG. 5. The battery pack 280 stores electrical energy provided by the battery management system 260 and provides electrical energy to the load 12.

The battery management system 260 may be used in connection with any embodiment mentioned herein. Battery management systems are commercially available and are well known to those having ordinary skill in the art and therefore not described in greater detail herein. The battery management system 260 utilizes a battery management interface 278 for connection to an external electrical power source, for example the power grid or a generator. A battery interface 278 is used to connect the battery pack 280 and the battery management system 260 to allow for the flow of electrical energy such that the battery back 200 is capable of being charged. The battery management system 260 also contains a management system controller 261 for providing logic control for charging and monitoring the battery pack 280 and communicating with other system components over a management system data bus interface 262. The battery management system 260 also contains a charger 263 that converts voltages and provides current to the battery 280 while it is recharging. The battery management system 260 controls current provided by the charger 263 and further includes voltage sensors 255, current sensor 264 and thermistors 252 for controlling the charging process of the battery pack 280. As shown, there is also a load databus interface 232 that is in communication with the load 12 and the visual display 240.

A voltage converter 274 is provided and is coupled to the battery management system 260 through first and second converter lines 276a, 276b and is also connected to first and second voltage lines 250a, 250b that are direct current (hereinafter referred to as DC). The voltage converter 274 provides efficient voltage conversion from one voltage to another. In particular, the voltage converter 274 is capable of stepping down the voltage of the battery pack 280 to twelve volts (hereinafter referred to as 12V) that is needed by logic management components in the battery management system 260 and other 12V components of the rechargeable battery power system 200. The voltage converter output can range from 12V to 13.5V.

Battery Sequential Shutdown System

Figure 6:
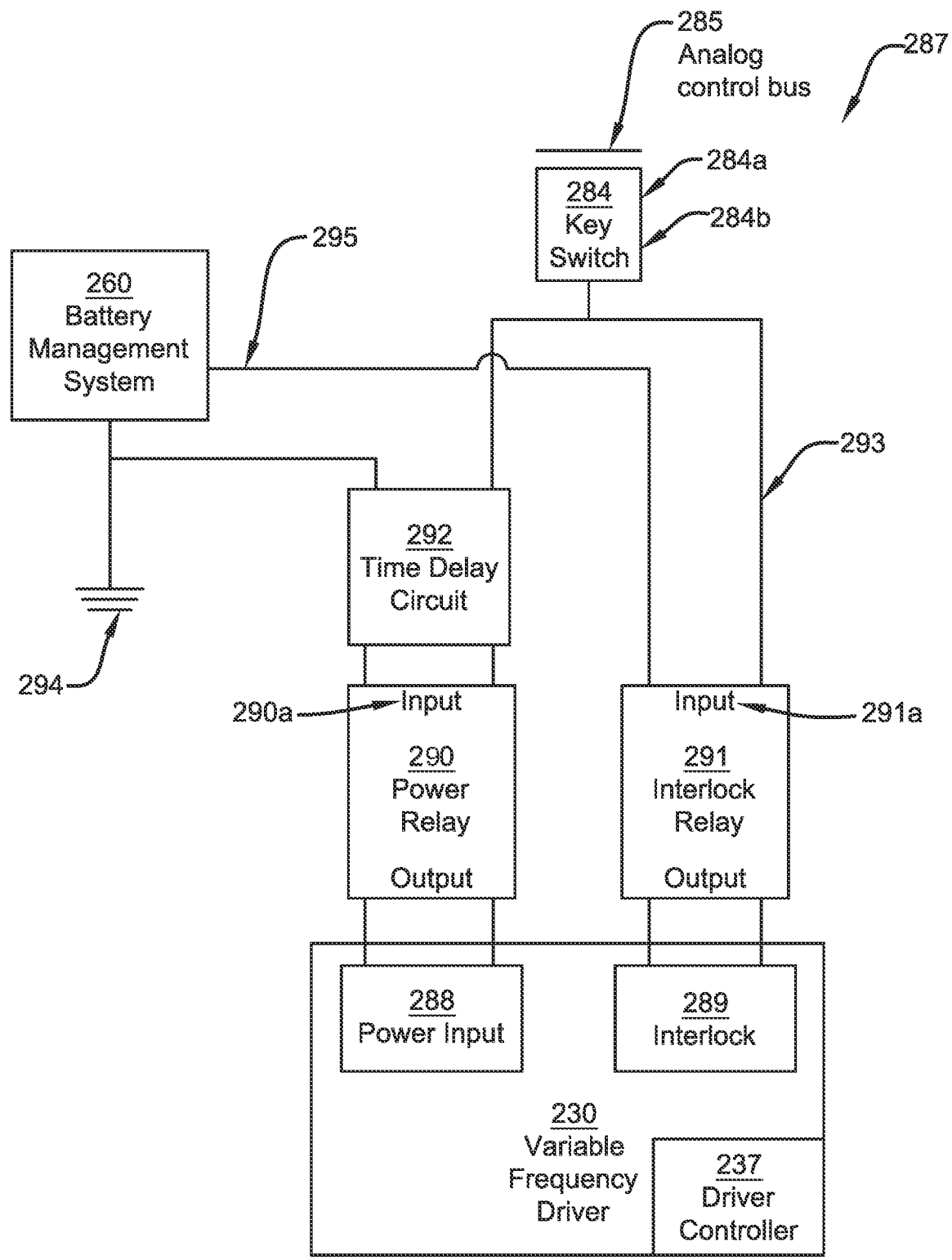
FIG. 6 is a schematic of a shutdown sequencer under the control of the battery management system.
Figure 10:
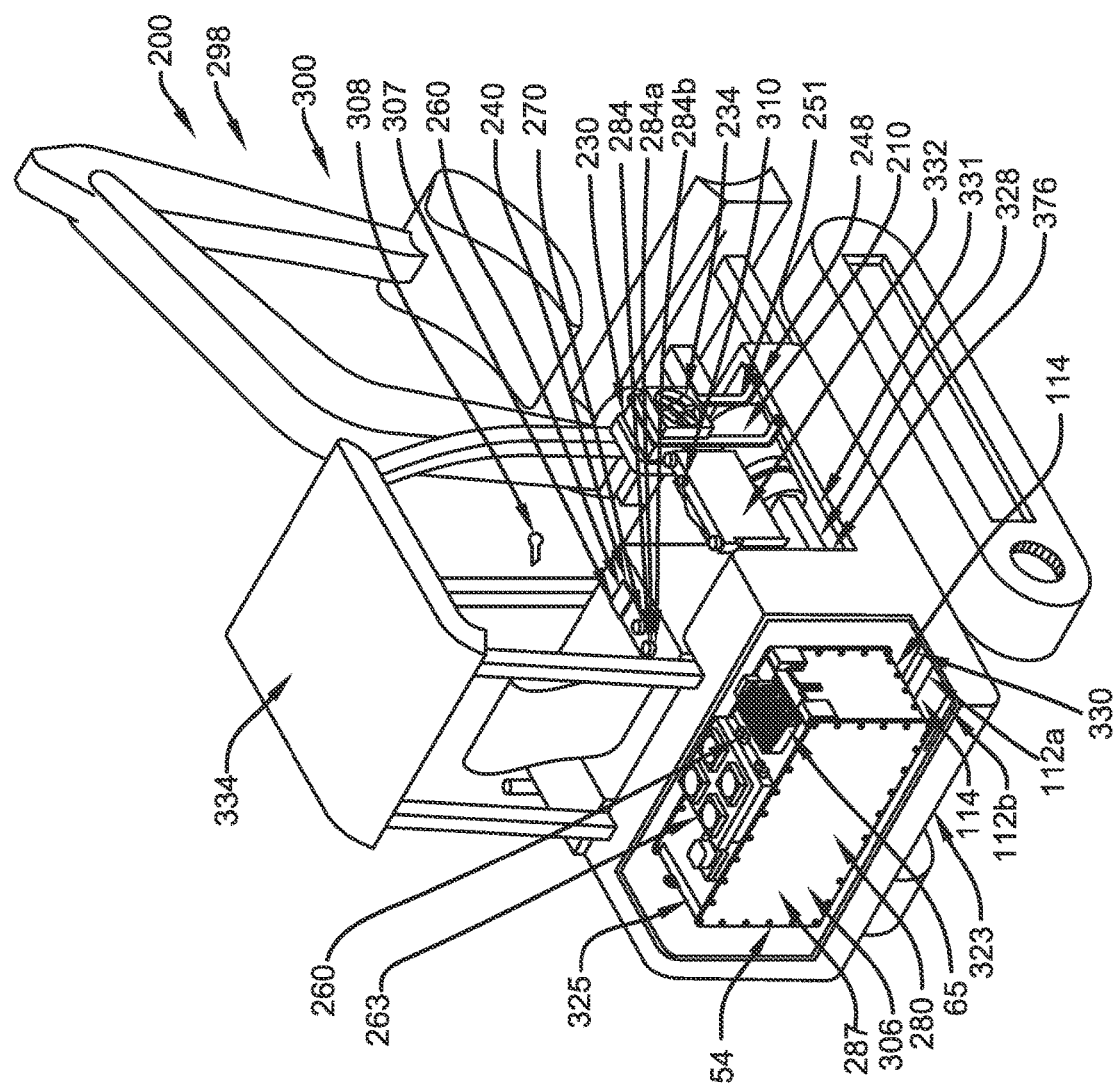
FIG. 10 is a perspective view of a hydraulic excavator having the rechargeable battery power system.

As shown in FIGS. 5, 6 and 10, the rechargeable battery power system 200 also includes a sequential shutdown system 287 so that when the key switch 284 (FIGS. 5 and 10) is moved into the "Off" position 284a the sequential shutdown system 287 controls the shutdown process for a piece of equipment 298, for example an excavator 300 as shown in FIG. 10. The sequential shutdown system 287 works in operative association with an analog control bus 285 and shown in FIGS. 5 and 6. There is an analog battery management shutdown line 287a that extends from the sequential shutdown system 287 to the battery management system 260. In particular, when the key switch 284 is moved to the "Off" position 284a the sequential shutdown system 287 commands a driver controller 237 (FIG. 6) of a variable frequency motor driver 230 to stop powering a variable frequency AC induction motor 210 (FIG. 10), then commands the driver controller 237 to shut down after a time delay. The purpose of this is to assure that there is no current flowing through the first and second voltage lines 250a, 250b and a main contactor 297 when the contactor opens. Opening the main contactor 297 (FIG. 5) with current flowing can cause damage to the main contactor 297 and/or the driver controller 237. As shown in FIG. 6, the variable frequency motor driver 230 includes two inputs, a power input 288 and an interlock input 289. The power input 288 provides a signal that commands the driver controller 237 to turn on. The interlock input 289 provides a signal commanding the driver controller 237 to allow current to flow to a variable frequency alternating current (hereinafter AC current) induction motor 210 and shown in FIG. 10. If the interlock input 289 is turned off, current will stop flowing to the variable frequency AC induction motor 210, but the driver controller 237 will stay on, and this will keep the main contactor 297 closed. Disconnecting the power input 288 will shut down the driver controller 237, causing the main contactor 297 to open immediately.

As shown in FIG. 6, the sequential shutdown system 287 includes a power relay 290 and an interlock relay 291 and a time delay circuit 292. Power relay and interlock inputs 290a, 291a to both the power and interlock relays 290, 291, respectively, are powered when the key switch 284 is turned to "Run" position 284b (FIG. 10), providing 12V DC power to the power and interlock relays 290, 291 via the key power line 293. The battery management system 260 controls the interlock relay 291 via the relay control line 295 that extends from the battery management system 260. The battery management system 260 includes battery management software 265 (FIG. 5) such the battery management system 260 is capable of allowing the battery 280 to discharge. The relay control line 295 is connected to a 12V ground 294, allowing the interlock relay input 291a to be powered via the key power line 293. This allows the s battery management software 265 to command the driver controller 237 to cut power to the AC induction motor 210 if there is a battery 280 fault or the state of charge of the battery 280 reaches zero. Battery management software and programming battery software for use in connection with a battery management system is well known to those having ordinary skill in the art and is therefore not described in greater detail herein.

The time delay circuit 292 maintains power to a power relay input 290a and a power relay 290 for one (1) second after the key switch 284 is turned to the "Off" position 284a, and in other embodiments about one second. The time delay circuit 292 may comprise any circuit that stores energy to power the power relay 290, such as a resistor-capacitor circuit or an integrated circuit timer (not shown). Timer circuits and time delay circuits are well known to those having ordinary skill in the art and therefore are not described in greater detail herein. If the key switch 284 is turned to the "Off" position 284a, the interlock relay 291 opens immediately, removing power from the interlock input 291a and stopping current flow to the AC induction motor 210. The power relay 290 opens one (1) second one second later, shutting down the motor driver controller 237 and opening the main contactor 297. This greatly reduces the possibility of the main contactor 297 and other components of the rechargeable battery power system 200 from being damaged during shutdown.

Battery Reserve Feature

In normal use, the battery management system 260 commands the driver controller 237 to cut power to the load 12 when the battery state-of-charge (hereinafter referred to as SOC and designated by reference number 296 in FIG. 7) that is the total voltage of the battery 280, or an individual cell 51 within the battery 280 reaches a set or predetermined lower limit. A problem with pieces of equipment, for example excavators now in use is that when the SOC reaches zero the machines in which they are employed become inoperable and are commonly left stranded, because these machines are unable to drive back onto a trailer to a charging location. A stranded machine is problematic, especially depending on the location where it shuts down and when it shuts down.

Figure 8:
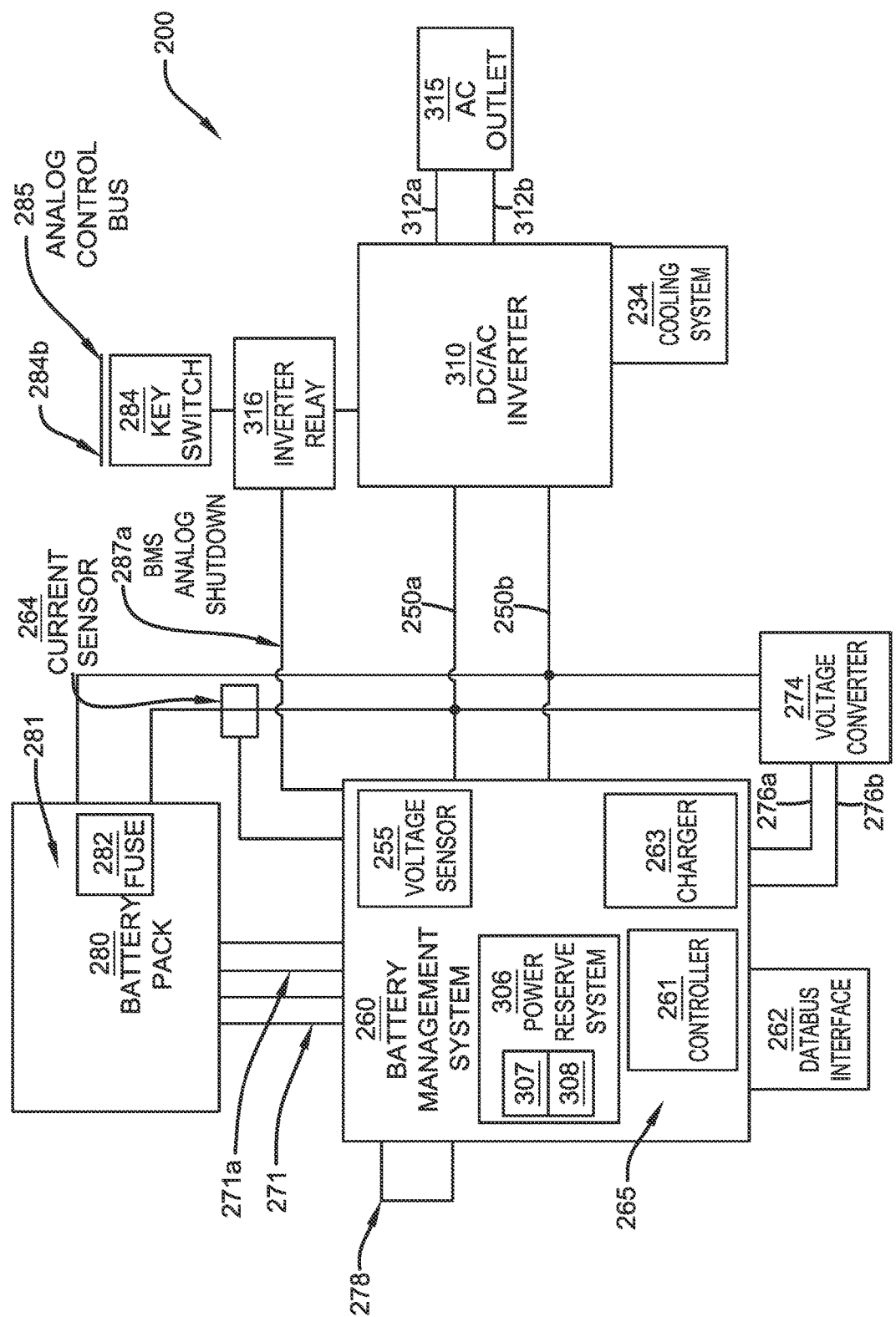
FIG. 8 is a system diagram of the of the battery management system showing a DC/AC inverter.
Figures 11, 12:
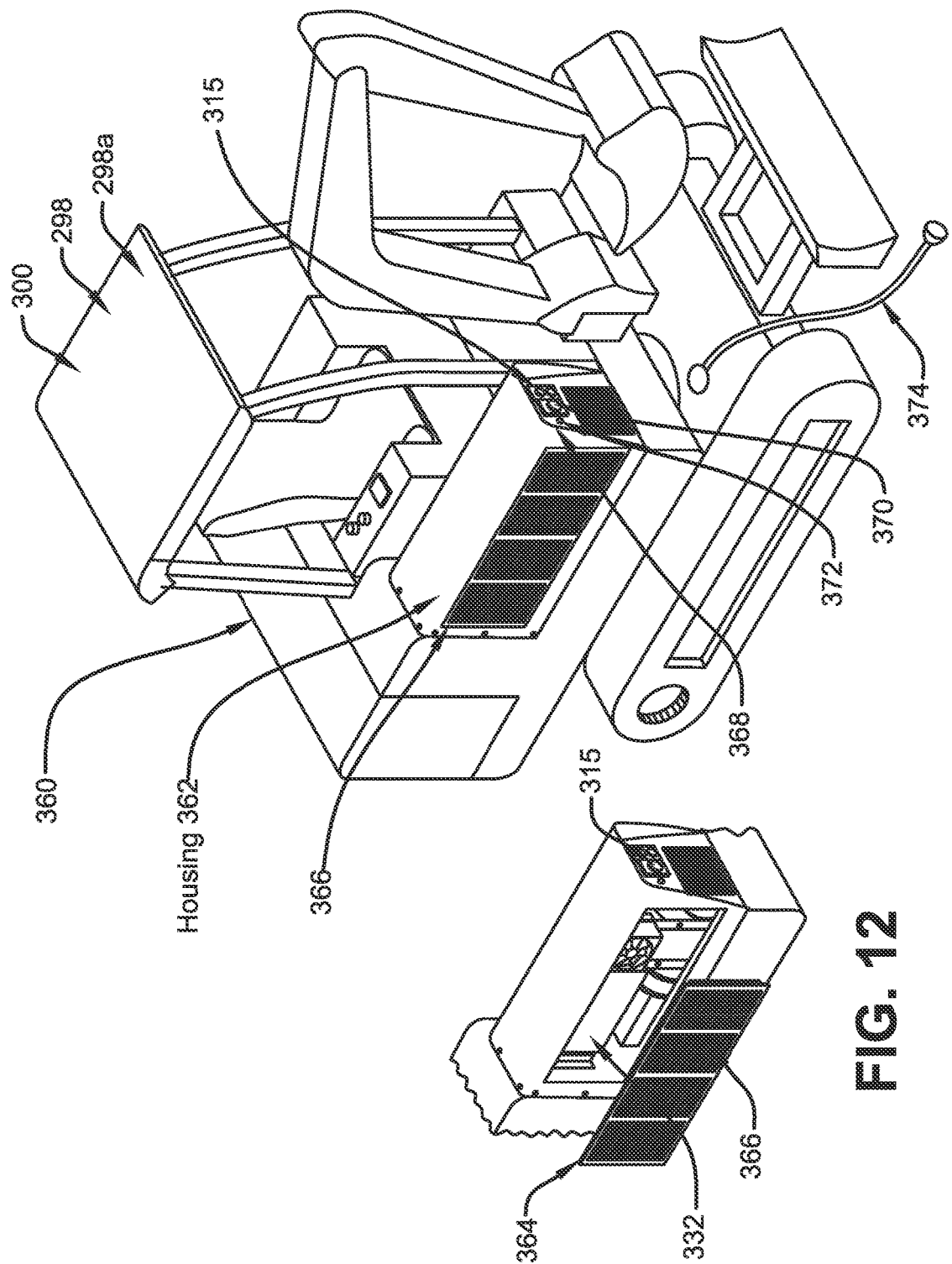
FIG. 11 is another perspective view of a hydraulic excavator having the rechargeable battery power system.
FIG. 12 is a view wherein an access door is removed.

As shown in FIGS. 10-12, in order to resolve the problem of a piece of equipment 298, for example an excavator 300, from becoming stranded or shutting down at an undesirable time or location, the rechargeable battery power system 200 has a power reserve system 306 under the control of the battery management system 260 that provides for a reserve of battery power (FIGS. 5 and 8). The power reserve system 306 allows the piece of equipment 298 to operate for a short period time after the battery management system 260 normally commands the driver controller 237 to cut power to the load 12. The power reserve system 306 is activated with a reserve switch 307 accessible by use of a reserve key 308 (FIG. 10). The use of a reserve key 308 is so that the machine operators (not shown) do not normally have access to the power reserve system 306. This ensures that a machine operator does not fully drain the battery 280, and ensures a foreman of other person with authority will be able to drive the piece of equipment 298 to a suitable location so that it can be recharged. In other preferred embodiments the power reserve system 306 could be controlled remotely, for example with a wireless device connected that may be connected to the Internet.

In order for the a power reserve system 306 to operate, the battery 280 has to have some usable energy remaining after the battery management system 260 first commands the driver controller 237 to cut power to the load 12. As shown in FIG. 7, this is accomplished by setting the normal SOC 296 lower limit at some percentage above zero, and individual cell 51 voltage lower limits above the lowest voltage that will not damage the individual cells 51. The total battery voltage lower limit may also be set higher than the lowest allowable battery voltage (defined as the lowest cell voltage multiplied by the number of individual cells 51 in series).

Figure 7:
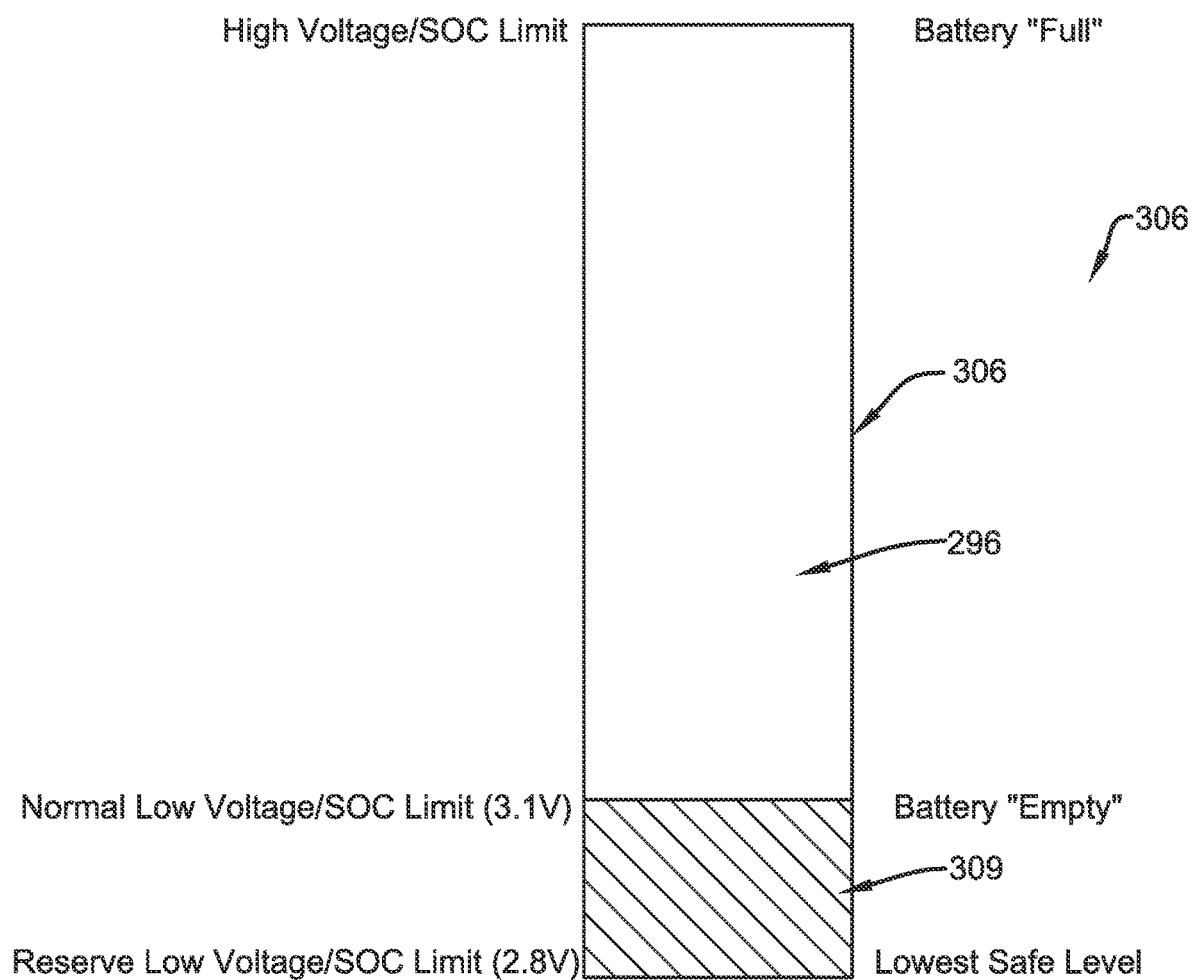
FIG. 7 shows a view of a battery capacity indicator wherein the battery capacity indicator includes a battery reserve capacity.

As shown in FIG. 7, the high voltage and SOC 296 upper limit exists when the battery 280 is fully charged. If the lowest allowable voltage is 2.8V (or some other amount in other embodiments) so that the individual cell 51 is not damaged, then normal lower limit voltage is set to 3.1V as shown (or some other amount in other embodiments), and the battery 280 appears to is empty as far as the operator of the excavator 300 is concerned. This means the operator can no longer use the excavator 300. When the power reserve system 306 is activated via the reserve switch 307 and reserve key 308 the battery management system 260 allows the excavator 300 to continue discharging the battery 280 until the battery 280 reaches a new cell voltage lower limit, for example 2.8V. These voltage limits are set such that the battery reserve 309 indicated in FIG. 7 provides enough run time to return the piece of equipment 298 or excavator 300 to a trailer or charging location. The battery management system 260 will then again commands the driver controller 237 to cut power to the load 12 the when an individual cell 51, the battery 280, and/or SOC 296 have reached the new lower limits set by the power reserve system 306. Thus, one of the reasons that only the foreman or a supervisor has access to the reserve key 308 is so that the operator is unable to run down the battery 280 to no charge and cause the piece of equipment become stranded at an undesired location.

The visual display 240 (FIGS. 5 and 10) will read zero or "empty" when the normal SOC 296 or voltage limits are reached, and a low battery warning 243 (FIG. 5) will appear on the visual display 240. When the power reserve system 306 activates the battery reserve function the visual display 240 will continue to read zero. When the battery 280 is charged the visual display 240 will reset to normal operation and display the amount of charge remaining.

It is pointed out that in order for the reserve function of the power reserve system 306 to operate as described above, the battery management system 260 has to command the driver controller 237 to cut power to the load 12 before the battery 280 has reached the absolute safe lower voltage limit. This reduces the normal usable capacity of the battery 280. However, raising the lower voltage limit of individual cells 51 has other advantages, namely it increases the cycle life of the individual cells 51 and also serves as a safety buffer such that damage to the battery 280 is less likely should there be a malfunction in any protection systems. Thus, using lower limits to SOC 296 and voltage that are higher than the lowest safe limits have a plurality of advantages that work in unison, but are weighed against a loss in usable capacity.

Thus, the rechargeable battery power system 200 can be deployed wherever there is a need for electricity for powering any devices and machines that require electricity to be operated.

FIG. 8 is a system diagram showing an AC outlet 315 for providing electric energy to the rechargeable battery power system 200. As shown, first and second AC lines 312a, 312b are provided and extend from the AC outlet 315 and an AC/DC inverter 310. There may also be an inverter cooling system 234 for cooling the AC/DC inverter 310. An inverter relay 316 is wired to the key switch 384 and the key switch 384 is in communication with the analog control bus 284 as shown. The remainder of the components shown in FIG. 8 have been previously described.

Thus, the rechargeable battery power system 200 can be used as a stand-alone unit to provide a source of electricity at virtually location. All that has to done to keep it operating is to re-charge the battery 280.

System Integration for New and Used Machines

The rechargeable battery power system 200 provides for a method of designing and implementing a battery electric power system in a piece of equipment 298 originally designed to be powered by an internal combustion engine. Or, a new piece of equipment 298 can be designed from scratch to accommodate the rechargeable battery power system 200 at the point of manufacture.

FIGS. 9-12 show the rechargeable battery power system 200 provided for used in the piece of equipment 298 that requires a power source, for example the excavator 300 shown in FIGS. 9-12. It is to be understood that the battery 280 can be used in connection with a plurality of different pieces of equipment without limitation.

Figure 9:
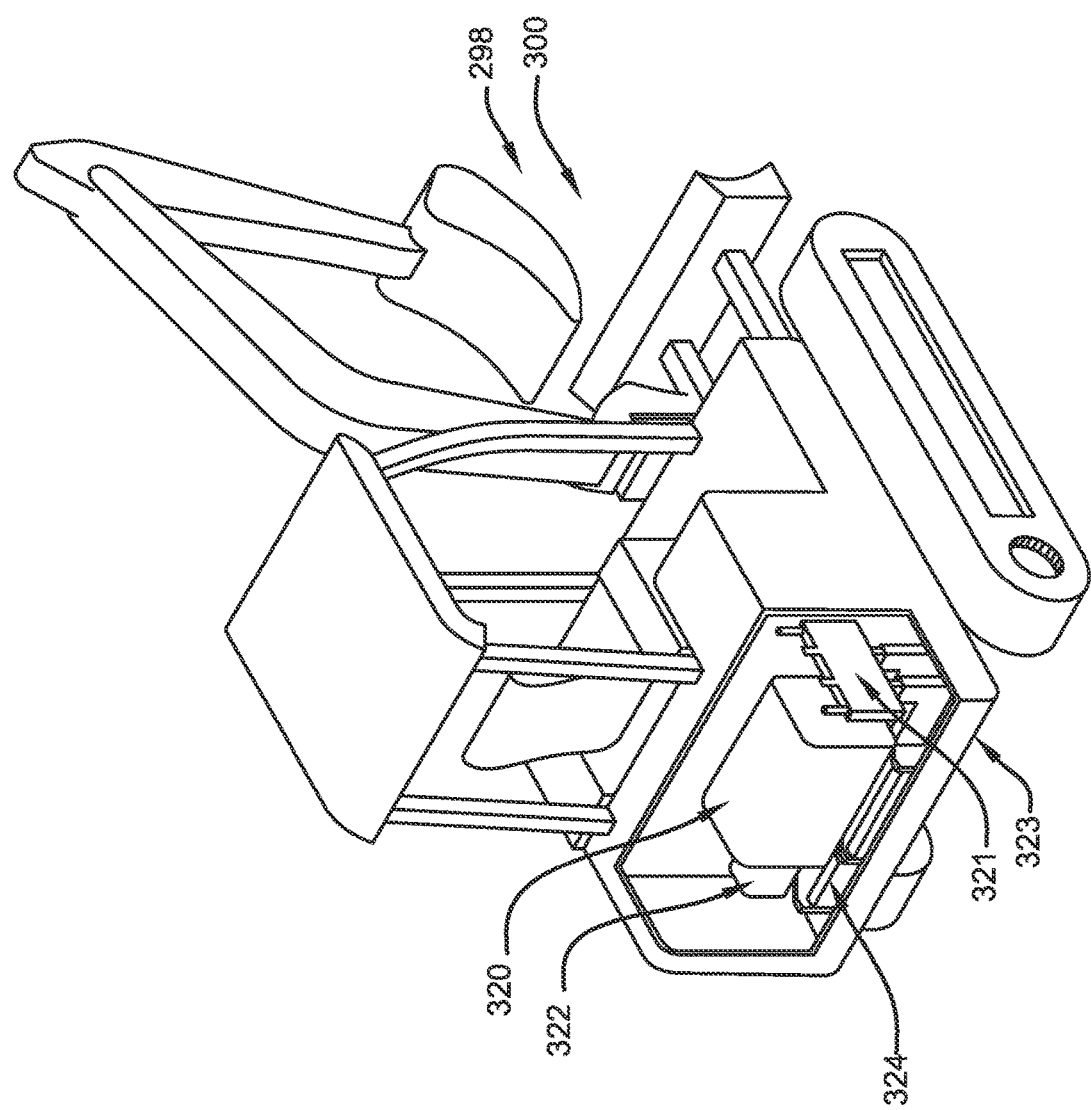
FIG. 9 shows a hydraulic excavator powered by an internal combustion engine such as a gas or diesel engine.

FIG. 9 shows the piece of equipment 298 that is embodied as the excavator 300 that is powered by an internal combustion engine 320, for example a gas or diesel engine, and having an engine cooling system 321, and a hydraulic pump 328. There is also a frame 323 that supports the engine 320 on frame support bars 324 that are supported by the frame 323. Mounting engines on frames is well known to those who have ordinary skill in the art and therefore not described in greater detail herein.

As shown in FIGS. 10-12, the excavator 300 is modified such that the internal combustion engine is not present. In its place is the above-described rechargeable battery power system 200 that includes the sequential shutdown system 287, power reserve system 306, and the other features described above).

First the internal combustion engine 320 and associated engine cooling system 321 are removed, along with the frame support bars 324, and this results in a battery recess being formed in the excavator 300 where the internal combustion engine 320 had previously been located. In addition, a fuel tank and other components necessary for the operation of an internal combustion engine (not shown) are removed from the excavator 300. Then, a battery support plate 330 (FIG. 10) is welded or otherwise joined to the frame 323. After installation of the battery support plate 330 the previously described battery assembly 40 and its battery pack 280 are placed on the first brace and second brace members 112a, 112b, that are mounted on the battery support plate 330.

The rechargeable battery power system 200 and battery management system 260 is operatively associated with and powers the excavator 300. Disposed on the battery 280 is a charger 263 for providing DC current to charge the battery 280. It is pointed out that the previously described first and second brace members 112a, 112b contact the battery support plate 330 and are secured to the battery support plate 330, and isolation mounts 114 may be secured to the first and second brace members 112a, 112b and the battery support plate 330 to reduce vibrations imposed on the battery 280.

In addition, as shown there is the variable frequency motor driver 230 that controls the variable frequency AC induction motor 210, that in, turn rotates and spins a hydraulic pump 328. A metal frame 251 is provided and it supports the variable frequency AC induction motor 210, the hydraulic pump 328, the cooling system 234 and other components that facilitate servicing and cleaning these drive components. In addition, the variable frequency AC induction motor 210 may be mounted on the frame 323 with motor isolation mounts 331 and the hydraulic pump 328 are may be mounted on the frame 323 with motor isolation mounts 331 and this isolates these components from the moving components of the excavator 300 or piece of equipment 298. This has a plurality of advantages, for example the variable frequency AC induction motor 210 and the hydraulic pump 328 are subjected to less stress because they are allowed to move freely and independently relative to the frame 323, and the excavator 300 runs more quietly because vibrations from the variable frequency AC induction motor 210 and the hydraulic pump 328 are transferred to the frame 323 to a much lesser degree as compared to the non-use of motor isolation mounts 331. This is because the frame 323 acts as a resonator if the variable frequency AC induction motor 210 and the hydraulic pump 328 are directly mounted thereon. The variable frequency motor driver 230 is supported on and connected to the frame 323 with driver isolation mounts 248 that are independently isolated relative to the variable frequency AC induction motor 210, the hydraulic pump 328, and the frame 323, and this isolates the drive controller 237 from vibrations that could damage the internal components over time.

A pump cooling system 332 cools the hydraulic fluid pumped by the hydraulic pump 328. The variable frequency motor driver 230, hydraulic pump 328 and pump cooling system 332 have been relocated as compared to their location in when employed in connection with an internal combustion engine. The battery management system 260 is disposed in the electronics enclosure 65 and is supported by the excavator 300. A load control, for example a throttle 270 and visual display 240 are disposed in the cab 334 of the excavator 300.

In addition, as shown in FIGS. 11 and 12 the excavator 300 further includes a battery cover 360 that is removable. There is a motor housing 362 that provides cover to the variable frequency AC induction motor 210 and hydraulic pump 328. A removable access door 364 is mounted to the motor housing 362 that provides for easy access to the above-described components. The access door 364 is also provided with vents 366. The motor housing 362 further includes an outlet panel 368 on which is mounted the AC outlet 315 and a charging port 370, and a charging light indicator 372 that emits light when the battery 280 is being charged. Also shown is a charging cord 374 that can be plugged into a power source to supply power to the charger 263 so that the battery 280 can be charged. The excavator 300 also includes controller arms 281 and 327 for controlling the operation of the excavator 300.

In addition, the variable frequency AC induction motor 210 is connected to the hydraulic pump 328, and the variable frequency AC induction motor 210 turns the hydraulic pump 328 to pressurize a hydraulic system 376 of the excavator 300. The variable frequency AC induction motor 210 is connected to the battery 280 by way of the variable frequency motor driver 230. Thus, there is no need for a diesel engine to turn the hydraulic pump 328.

The battery 280, variable frequency AC induction motor 210 along with the other components described above provide for a counter weight that provides for proper weight distribution for the piece of equipment 298, as shown in FIG. 11 the excavator 300.

In another embodiment the piece of equipment 298 or excavator 300 is newly manufactured and constructed to have the machine rechargeable battery power system 200 and features described immediately above at the point of manufacture. In other words, the machine rechargeable battery power system 200 is installed at the point of manufacture of the piece of equipment 298 or excavator 300, such that a newly manufactured piece of equipment 298, for example an excavator 300, is ready for use when purchased or leased.

Thus, the present machine rechargeable battery power system 200 provides for a method of building new existing pieces 298a (FIG. 11) and rebuilding existing pieces of equipment 298, for example excavators 300. For rebuilding an excavator 300, the method would comprise the steps of:

providing an excavator 300 powered by an internal combustion engine 320;

extracting the engine 320 from the excavator 300;

modifying the frame 310 of the excavator 300 such that it is capable of supporting a support plate 330 and fitting the support plate 320 on the frame 323 and supporting the battery assembly 48 that includes the battery 260 on the support plate 330;

providing and installing a variable frequency motor driver 230 and the variable frequency AC induction motor 210 such that they are supported by the frame 332;

providing the hydraulic pump 328 and a pump cooling system 332 for cooling the hydraulic fluid pumped by the hydraulic pump 328, which are relocated from their placement in the internal combustion engine 320; and, providing the battery management system 260 and disposing the battery management system 260, the throttle 270 and the visual display 240 in the cab 334 of the excavator 300.

Figure 13:
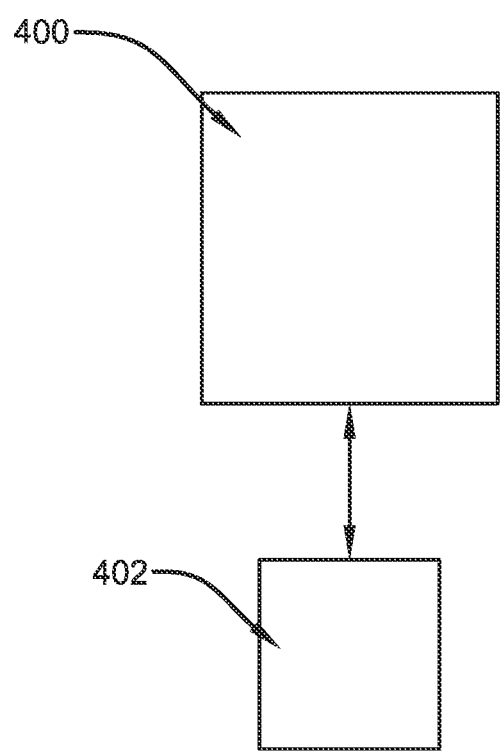
FIG. 13 is a block diagram depicting an original manufacturer and customer relationship.

In addition, the original manufacturer 398 can act as a service provider 400 as shown in FIG. 13 for the rechargeable battery power system 200 and can provide engineering services to third party equipment manufacturers and customers 402, such that the third party equipment manufactures 402 can build pieces new pieces of equipment 298 that include the rechargeable battery power system 200 at the point of manufacture, or so that customers 402 can have their rechargeable battery power systems 200 serviced by the original manufacturer 398 service provider 400. The original manufacturer 398 can also provide engineering services to rebuild existing pieces of equipment 298 such as removing the internal combustion engine 320 and installing the rechargeable battery power system 200. In addition, the original manufacturer 398 of the rechargeable battery power system 299 can provide services, including engineering services, such that newly built pieces of equipment 298 made with the rechargeable battery power system 200 already build into the piece of equipment 298 are properly assembled. The original manufacturer 398 of the rechargeable battery power system 200 can also provide engineering services and repair services to businesses that have purchased the rechargeable battery power system 10. For example, in the event the rechargeable battery power system 200 becomes damaged, for example in a work site accident, the original manufacturer 398 can provides services to repair or replace the rechargeable battery power system 200. The original manufacturer 398 or an entity licensed by the original manufacturer 398 can do all of the above and charge fees for parts and labor thus generating income. In original manufacturer 398 can also generate income by performing routine services on the rechargeable battery power system 200. This is because maintenance of pieces of equipment 298 is a normal cost associated with using the piece of equipment 298. The original manufacturer 298 of the rechargeable battery power system 10 has both the expertise and knowledge to service and maintain the rechargeable battery power system 10. Thus, there exists a large potential for generating income associated with use of the rechargeable battery power system 10.

It is pointed out that the rechargeable battery power system 10 are not limited to just excavators 300, but may be used in virtually all construction equipment 298, for example, new and used paving machines, rollers, graders, paving machines, loaders, tractors and trucks and other machines that require a power source. Thus, virtually any piece of equipment 298 having an internal combustion engine 320, for example a gas or diesel engine, and having the engine cooling system 321 and a hydraulic pump may be modified to accept the machine rechargeable battery power system 10

It is pointed out that the use of the rechargeable battery power system 200 provides for power with no pollution at a work, job or activity site, a minimal amount of noise at such sites, and no fuels need at the sites. In addition, because there is no noise and there is no messy odiferous fuels used at the sites the rechargeable battery power system 200 can be used day or night. Thus, workers can work throughout the night without disturbing the neighborhood or city in which they are working. Additionally, the machine rechargeable battery power system 200 can be used indoors, whereas toxic emissions from an internal combustion engine 302 would prohibit it from being used indoors. In addition, the above-described battery 280 can be used by itself to supply electric power as a stand-alone power source. So if electrical power is required anywhere, for example a work site, a factory, event lighting and the like, the battery 280 can meet all the power needs.

In addition, the method of assembling the battery 280 may include more than 1000 individual cells 51 and includes quality control checks at all stages of assembly. In addition, because the battery 280 is waterproof, it can remain in wet environments without damage to the internal components thereof.

It will be appreciated by those skilled in the art that while the rechargeable battery power system 200 and methods for providing and using a rechargeable battery systems have been described in connection with particular embodiments and examples, the rechargeable battery power system 200 the methods associated therewith are not necessarily so limited and that other examples, uses, modifications, and departures from the embodiments, examples, and uses may be made without departing from the rechargeable battery power system 200 and associated methods and all these embodiments are intended to be within the scope and spirit of the appended claims.

What is claimed:
1. A battery assembly comprising:
a battery housing and a battery positioned in the battery housing;
the battery housing having a base wall that supports opposed first and second side walls and opposed first and second end walls, and having a top wall that is supported on the opposed first and second side walls and opposed first and second end walls, such that the top wall faces the base wall, and a battery positioned in the battery housing;
the first sidewall includes a metal layer and first and second foam layers and a plastic sheet, such that the first foam layer abuts against the metal layer, and the first foam layer abuts the second foam layer, and the second foam layer abuts the plastic sheet such that the rechargeable battery faces the plastic sheet;
the second sidewall includes a metal layer and first and second foam layers and a plastic sheet such that the first foam layer abuts against the metal layer, and the first foam layer abuts the second foam layer, and the second foam layer abuts against the plastic sheet such that the battery faces the plastic sheet;
the first end wall has an interior side and a first end wall plastic sheet, and a first end wall foam sheet, wherein the interior side abuts the first end wall plastic sheet, such that the first end wall plastic sheet abuts the interior side of the first end wall and the first end wall foam sheet, and wherein the second end wall has an interior side and a second end wall plastic sheet, and a second end wall foam cover sheet, wherein the interior side abuts the second end wall plastic sheet, such that the second end wall plastic sheet abuts the interior side of the second end wall and the second end wall foam sheet;
the base wall has interior and exterior metal base wall surfaces, and a base wall rubber sheet is mounted on the interior metal base wall surface;
the top wall includes opposed interior and exterior top wall sides, and the interior top wall side supports a module cover sheet, and an electronics enclosure extends from the exterior top wall side, and a metal plate is supported on the electronics enclosure, and an enclosure foam sheet is supported by the metal plate such that enclosure foam sheet extends into the electronics enclosure;

the second end wall has an exterior end wall surface and a service disconnect is mounted to the second end wall; and, the battery includes a first module bank having a first group of modules, and wherein the first group of modules has individual modules, and each individual module is made of individual cells.

2. A rechargeable battery power system for use in connection with a piece of equipment, the rechargeable battery power system comprising:

a battery assembly having a battery housing and a battery and wherein a battery is disposed in the battery housing, and the battery has a first module bank having modules, and wherein the first group of modules has individual modules, an each individual module is made of individual cells;

a battery management system and a battery line that extends from battery to the battery management system and a visual display is provided and in communication with the battery management system;

a driver controller for controlling a variable frequency motor driver connected to and powered by the battery;

a variable frequency AC induction motor with motor drive lines connected to the variable frequency motor driver, and the AC induction motor having an output shaft and a hydraulic pump driven by the output shaft and wherein driver controller and the AC induction motor are mounted on the piece of equipment;

a battery management interface for connection to an external power source for charging the battery;

a sequential shutdown system and a management shutdown line extends from the sequential shutdown system to the battery management system and the sequential shutdown system for controlling the shutdown of the piece of equipment;

wherein the piece of equipment has a key switch that has an off position and an on position and the battery is disposed in the piece of equipment and when the key is turned from the on position to the off position the sequential shutdown system controls the shutdown process for the piece of equipment further including an analog shutdown line that extends from the sequential shutdown system such that when the key switch is moved to the off position the driver controller cuts off power to the variable frequency AC induction motor first to prevent damage to the driver controller, and wherein the sequential shutdown system commands the driver controller of the variable frequency motor driver to stop powering the variable frequency AC induction motor and then commands the driver controller to shut down after a time delay further including a safety switch that is capable of turning off the variable frequency motor driver and the safety switch is connected to a safety bar that is supported on the piece of equipment and wherein when the safety bar is moved by the operator upon exiting the piece of equipment the safety switch cuts power to the variable frequency AC induction motor for operator safety and to eliminate the possibility of battery drain, and, wherein the sequential shutdown system further includes power relay and an interlock relay and a time delay circuit, and when the key, is in an on position inputs to both the power relay and the interlock relay are powered providing direct current power to the power relay and the interlock relay via a key power line that is under the control of the battery management system, and wherein the battery management system allows the battery to discharge a relay control line connected to a 12V ground allows the interlock relay input to be powered such that the battery management system is capable of cutting power to the AC induction motor if there is a battery fault or the battery state of charge of the batter reaches zero.

3. The rechargeable battery power system according to claim 2 wherein the variable frequency motor driver includes a power input and an interlock and the power input provides a signal commanding the driver controller to turn on, and the interlock input provides a signal commanding the driver controller to allow current to flow to the variable frequency AC induction motor, and when the interlock input is turned off current stops flowing to the variable frequency AC induction motor while the driver controller remains on so that disconnecting the power input will shut down the driver controller.

4. The rechargeable battery power system according 3 wherein the time delay circuit maintains power to the power relay input and the power relay for one second after the key switch is turned to the off position such that in a shutdown event the interlock relay opens removing power from the interlock input and stopping current flow to the variable frequency AC induction motor from the battery with the power relay opening about one second later shutting down the motor driver controller.

5. The rechargeable battery power system according 4 further including a battery assembly that includes:

a battery housing having a base wall joined to first and second side walls and the base wall joined to opposed first and second end walls; and having a housing cover that is joined to the first and second opposed side walls and the opposed first and second end walls such that the cover is disposed opposite the base wall;

the first sidewall includes a metal layer and first and second foam layers and a plastic such that the first foam layer abuts against and is joined with the metal layer, and the first foam layer abuts against and is joined with the second foam layer, and the second foam layer abuts against and is joined with the plastic sheet;

wherein the second side wall is structurally identical to the first side wall;

the cover has opposed exterior and interior sides and a service disconnect is extends from the exterior side;

joined to the interior side of the cover is a plastic sheet, and a foam cover sheet is joined to the plastic sheet such that the plastic sheet is disposed between the interior side of the cover and the foam cover sheet;

wherein the first end wall is joined to a first end wall foam sheet and the second end wall is joined to a second end wall foam sheet, and the second end wall has an exterior end wall surface and a current sensor is mounted to the second end wall;

the base wall having a base wall sheet having opposed interior and exterior base wall surfaces and wherein joined to the interior base wall surface is a first base wall plastic sheet that is joined to a second base wall rubber sheet;

the battery and wherein the battery is disposed in the battery housing.

6. A rechargeable battery power system having a power reserve comprising:

a battery assembly having a battery housing and a battery and wherein the battery is disposed in the battery housing;

the battery has a module bank having modules and wherein each module has individual cells;

a battery management system and a battery line that connects the battery and the battery management system and a visual display connected to the battery management system;

a driver controller for controlling a variable frequency motor driver connected to and powered by the battery;

a variable frequency AC induction motor with motor drive lines connected to the variable frequency motor driver and the AC induction motor having an output shaft;

a battery management interface for connection to an external power source for charging the battery, a sequential shutdown system and a management shutdown line extends from the sequential shutdown system to the battery management system and the sequential shutdown system for controlling the shutdown of a piece of equipment such that the rechargeable battery power system is used in connection with the piece of equipment; and, a power reserve system that is connected to and operates with the battery management system such that a source of reserve power, wherein the piece of equipment has a key switch that has an off position and an on position and the battery is disposed in the piece of equipment and when the key is turned from the on position to the off position the sequential shutdown system controls the shutdown process for the piece of equipment further including an analog: shutdown line that extends from the sequential shutdown system such that when the key switch is moved to the off position the driver controller cuts off power to the variable frequency AC induction motor first to prevent damaoe to the driver controller, and wherein the sequential shutdown system commands the driver controller of the variable frequency motor driver to stop powering the variable frequency AC induction motor and then commands the driver controller to shut down after a time delay further including a safety switch that is capable of turning off the variable frequency motor driver and the safety switch is connected to a safety bar that is supported on the piece of equipment and wherein when the safety bar is moved by the operator upon exiting the piece of equipment the safety switch cuts power to the variable frequency AC induction motor for operator safety and to eliminate the possibility of battery drain; and, wherein the sequential shutdown system further includes power relay and an interlock relay and a time delay circuit, and when the key is in an on position inputs to both the power relay and the interlock relay are powered providing direct current power to the power relay and the interlock relay via a key power line that is under the control of the battery management system, and wherein the battery management system allows the battery to discharge a relay control line connected to a 12V Ground allows the interlock relay input to be powered such that the battery management system is capable of cutting power to the AC induction motor if there is a battery fault or the battery state of charge of the batter reaches zero.

7. The rechargeable battery power system having a power reserve according to claim 6 wherein when the battery management system initiates the sequential shutdown system to activate when at least one of the following occurs: a battery state-of-charge; or the total voltage of the battery; or the voltage of a cell of the battery reaches a predetermined low limit.

8. The rechargeable battery power system having a power reserve according to claim 7 wherein the predetermined low limit of voltage is 3.1 volts.

9. The rechargeable battery power system having a power reserve according to claim 6 wherein the piece of equipment has a reserve switch for accessing the power reserve system and further includes a reserve key and wherein the reserve key is not under the control of an operator of the piece of equipment.

10. The rechargeable battery power system having a power reserve according to claim 6 further including a DC/AC inverter in communication with the battery management system and lead lines extend from the extend from the DC/AC inverter to an AC outlet disposed on the piece of equipment such that when the reserve switch is turned to an AC position AC power is supplied to an AC outlet disposed on the piece of equipment.

11. The rechargeable battery power system having a power reserve according to claim 6 wherein the battery has charge remaining after the battery management system cuts power to the motor.

12. The rechargeable battery power system having a power reserve according to claim 11 wherein the battery has a state of charge with an upper limit of voltage when the battery is fully charged and a normal state of charge lower limit at percentage of charge above zero charge.

13. The rechargeable battery power system having a power reserve according to claim 12 wherein the lowest allowable voltage limit of the cell is set to 2.8V and the normal lower limit voltage of the cell is set to 3.1 V such that the battery appears to be empty when observed by the operator of the piece of equipment.

14. The rechargeable battery power system having a power reserve according to claim 13 wherein when the power reserve system is activated upon turning the reserve switch the battery management system allows the piece of equipment to continue discharging the battery until the battery reaches the lowest allowable voltage cell voltage limit of 2.8V.

15. The rechargeable battery power system having a power reserve according to claim 14 further including a battery assembly that includes:

a battery housing having a base wall joined to first and second side walls and the base wall joined to opposed first and second end walls; and having a housing cover that is joined to the first and second opposed side walls and the opposed first and second end walls such that the cover is disposed opposite the base wall;

the first sidewall includes a metal layer and first and second foam layers and a plastic such that the first foam layer abuts against and is joined with the metal layer, and the first foam layer abuts against and is joined with the second foam layer, and the second foam layer abuts against and is joined with the plastic sheet;

wherein the second side wall is structurally identical to the first side wall;

the cover has opposed exterior and interior sides and a service disconnect is extends from the exterior side;

joined to the interior side of the cover is a plastic sheet, and a foam cover sheet is joined to the plastic sheet such that the plastic-sheet is disposed between the interior side of the cover and the foam cover sheet;

wherein the first end wall is joined to a first end wall foam sheet and the second end wall is joined to a second end wall foam sheet, and the second end wall has an exterior end wall surface and a current sensor is mounted to the second end wall;

the base wall having a base wall sheet having opposed interior and exterior base wall surfaces and wherein joined to the interior base wall surface is a first base wall plastic sheet that is joined to a second base wall rubber sheet; and, the battery and wherein the battery is disposed in the battery housing, wherein the first end wall is joined to a first end wall foam sheet and the second end wall is joined to a second end wall foam sheet, and the second end wall has an exterior end wall surface and a current sensor is mounted to the second end wall;

the base wall has a metal base wall sheet having opposed interior and exterior metal base wall surfaces and wherein joined to the interior metal base wall surface is a first base wall sheet that is joined to a second base wall rubber sheet.

16. A method of servicing a battery comprising the acts of: servicing a battery assembly having:
- a first module bank having a first group of modules, and wherein the first group of modules has individual modules, and each individual module is made of individual cells;
- a battery housing and a battery positioned in the battery housing and the battery housing having a base wall that supports opposed first and second side walls and opposed first and second end walls, and having a top wall that is supported on the opposed first and second side walls and opposed first and second end walls, such that the top wall faces the base wall, and a battery positioned in the battery housing;
- the first sidewall includes a metal layer and first and second foam layers and a plastic sheet, such that the first foam layer abuts against the metal layer, and the first foam layer abuts the second foam layer, and the second foam layer abuts the plastic sheet such that the rechargeable battery faces the plastic sheet;
- the second sidewall includes a metal layer and first and second foam layers and a plastic sheet such that the first foam layer abuts against the metal layer, and the first foam layer abuts the second foam layer, and the second foam layer abuts against the plastic sheet such that the battery faces the plastic sheet;
- wherein the first end wall has an interior side and a first end wall plastic sheet, and a first end wall foam sheet, wherein the interior side abuts the first end wall plastic sheet, such that the first end wall plastic sheet abuts the interior side of the first end wall and the first end wall foam sheet, and wherein the second end wall has an interior side and a second end wall plastic sheet, and a second end wall foam cover sheet,
- wherein the interior side abuts the second end wall plastic sheet, such that the second end wall plastic sheet abuts the interior side of the second end wall and the second end wall foam sheet;
- wherein the base wall has interior and exterior metal base wall surfaces, and a base wall rubber sheet is mounted on the interior metal base wall surface; and,
- the top wall includes opposed interior and exterior top wall sides, and the interior top wall side supports a module cover sheet, and an electronics enclosure extends from the exterior top wall side, and a metal plate is supported on the electronics enclosure, and an enclosure foam sheet is supported by the metal plate such that enclosure foam sheet extends into the electronics enclosure.

17. The method of servicing a battery according to claim 16 wherein the battery includes a first module bank having a first group of modules, and wherein the first group of modules has individual modules, and each individual module is made of individual cells and maintaining the modules and maintaining the individual cells.

* * * * *